(12) United States Patent
Ledet

(10) Patent No.: US 11,730,314 B2
(45) Date of Patent: Aug. 22, 2023

(54) GRILL

(71) Applicant: Robert Ledet, Montegut, LA (US)

(72) Inventor: Robert Ledet, Montegut, LA (US)

( * ) Notice: Subject to any disclaimer, the term of this patent is extended or adjusted under 35 U.S.C. 154(b) by 332 days.

(21) Appl. No.: 17/224,717

(22) Filed: Apr. 7, 2021

(65) Prior Publication Data

US 2022/0322875 A1  Oct. 13, 2022

(51) Int. Cl.
*A47J 37/06* (2006.01)
*A47J 37/07* (2006.01)

(52) U.S. Cl.
CPC ....... *A47J 37/0682* (2013.01); *A47J 37/0704* (2013.01); *A47J 37/0768* (2013.01)

(58) Field of Classification Search
CPC ................ A47J 37/0647; A47J 37/0682; A47J 37/0704; A47J 37/0713; A47J 37/0727; A47J 37/0731; A47J 37/074; A47J 37/0768; A47J 36/2422; A47J 36/2427; A47J 36/245; A47J 36/2455
See application file for complete search history.

(56) References Cited

U.S. PATENT DOCUMENTS

| 9,591,947 B2* | 3/2017 | Fogolin | A47J 37/0704 |
|---|---|---|---|
| 10,010,217 B1* | 7/2018 | Miller | A47J 37/0704 |
| 2014/0216436 A1* | 8/2014 | George | A47J 37/0786 99/447 |
| 2017/0130966 A1* | 5/2017 | Barajas | A47J 37/07 |
| 2019/0274479 A1* | 9/2019 | Chung | A47J 37/0704 |
| 2020/0329910 A1* | 10/2020 | Liu | A47J 37/0731 |
| 2021/0085126 A1* | 3/2021 | Bartlett | A47J 37/0704 |
| 2022/0113032 A1* | 4/2022 | Jiang | F24C 15/16 |

OTHER PUBLICATIONS

Nexgrill, Evolution Infrared Plus 5-Burner Propane Gas Grill with Stainless Steel Side Burner, Captured from https://nexgrill.com/products/evolution-5-burner-gas-grill on Apr. 5, 2021.
Barbecue Bible Kalamazoo Gourmet: Embracing the World's Oldest Cooking Method, Captured from https://barbecuebible.com/2019/08/09/wood-fire-grilling-kalamazoo-gourmet/ on Apr. 5, 2021.

* cited by examiner

*Primary Examiner* — Hung D Nguyen
(74) *Attorney, Agent, or Firm* — Edel Patents LLC; John B. Edel

(57) ABSTRACT

Grills configured with adjustable and moveable radiant barriers may include a body, a lid, a cooking grate, a combustion space within the body and two plates making up part of the adjustable and moveable radiant barriers. The first plate may include openings through which radiant heat may pass and the second plate may have similar openings. The lid and the body may form a cooking enclosure with the interior cooking grate being substantially parallel to both the first plate and the second plate. The two plates may be configured to move relative to one another such that the openings may alternatingly align and offset creating an adjustable rate of transmission of thermal radiation between the combustion space and the cooking grate.

12 Claims, 2 Drawing Sheets

Fig. 2
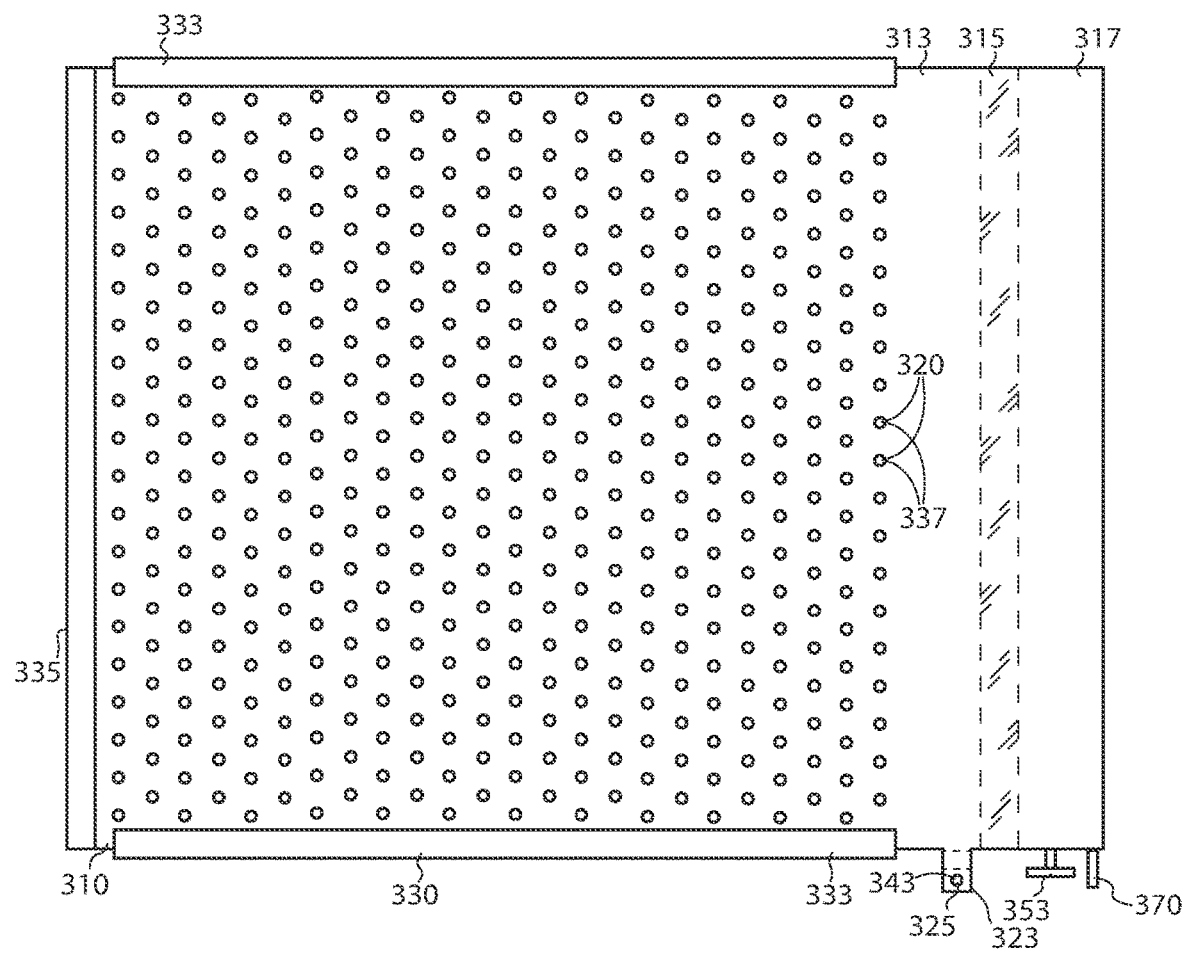
Fig. 3

GRILL

Grills described herein may be used in the grilling of a wide variety of foods. Certain grills described herein may have the ability to regulate radiant heat delivered from a combustion area.

BRIEF DESCRIPTION OF THE DRAWINGS

FIG. 2 shows a top view of an adjustable radiant shield.
FIG. 3 shows a side view of an adjustable radiant shield.

DETAILED DESCRIPTION

Figure 1:
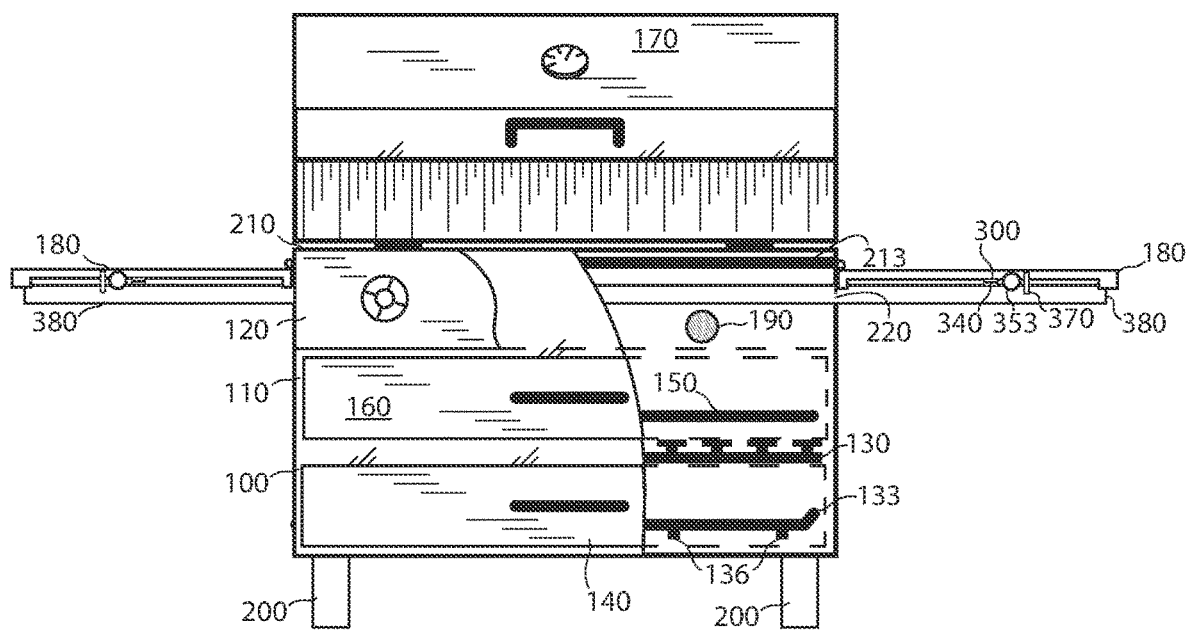
FIG. 1 shows a front view of a grill.

Grill 100 may for example comprise Grill body 110, Control panel 120, Gas burners 130, Catch tray 133, Catch tray support 136, Catch tray drawer 140, Solid fuel grate 150, Solid fuel drawer 160, Grill lid 170, Grill side trays 180, Bypass exhaust 190, Legs 200, Body top opening 210, Grilling grate 213, Side aperture 220, Adjustable radiant shield 300, and Shield support 380.

Adjustable radiant shield 300 may, for example, comprise Top plate 310, op plate main body 313, Top plate bend 315, Top plate shelf 317, Top plate holes 320, Top plate alignment tab 323, Top plate alignment hole 325, Bottom plate 330, Slide past fold-over guides 333, Slide stop fold-over guide 335, Bottom plate holes 337, Bottom plate alignment tab 340, Bottom plate alignment hole 343, Rack and pinion adjustment system 350, Overlap adjustment knob 353, and Push tab 370 with Adjustable radiant shield 300 being supported by Shield support 380.

Grill 100 may for example comprise Grill body 110 and Grill lid 170. Grill body 110 may be arranged to support Shield support 380. Shield support 380 may be a rectangular box constructed of angle iron such that the box is the approximate depth of the interior of Grill body 110 and the width of the box is approximately twice the width of Grill body 110. The angle iron may be welded together such that all horizontal components of the angle iron face the interior of the box in a manner that creates an interior ledge for the holding of a substantially rectangular sheet like objects such as Adjustable radiant shield 300. Shield support 380 may be welded to the interior of Grill body 110 at the front and the rear of Grill body 110.

Control panel 120 may be used to control the gas to Gas burners 130 which may be above Catch tray drawer 140. Catch tray 133 may be situated within Catch tray drawer 140 on Catch tray support 136 such that ash, grease, and other debris from the grilling above is collected in Catch tray 133 and may be easily be removed by opening Catch tray drawer 140 and removing Catch tray 133. Catch tray 133 may either be cleanable and replaceable or disposable. Grill lid 170 is configured to close against Body top opening 210.

Solid fuel grate 150 may be positioned within Solid fuel drawer 160 such that Solid fuel grate 150 may slide out when Solid fuel drawer 160 is opened. Solid fuel grate 150 may be positioned just above Gas burners 130 such that Gas burners 130 are configured to ignite solid fuel positioned on Solid fuel grate 150. Solid fuel grate 150 may be constructed from expanded metal grate. Thus, Grill 100 may be configured as a dual fuel grill. Alternately, Grill 100 may be configured either as a solid fuel only grill, as a gas grill, or as a propane grill. Grill 100 may alternatively be powered by other fuel sources known to the grilling and barbecue art. Solid fuel grate 150 may, for example, be 8 inches below Grilling grate 213. The top surface of Top plate 310 at Top plate main body 313 may, for example, be between 3 and 4 inches above Solid fuel grate 150. In a related embodiment, the top surface of Top plate 310 at Top plate main body 313 may, for example, be between 1 and 7 inches above Solid fuel grate 150.

Grill side trays 180 may be arranged and configured to cover the portions of Shield support 380 outside of Grill body 110. Grill side trays 180 may also be arranged and configured to be either removed or raised. Grill side trays 180 may for example be raised on a hinge attached to Grill body 110.

Adjustable radiant shield 300 may be arranged and slidably positioned on Shield support 380 such that Adjustable radiant shield 300 may slide through Side aperture 220. Side aperture 220 may be sized to limit airflow through Side aperture 220 and may include any number of types of seals to reduce such airflow. By sliding through Side aperture 220, Adjustable radiant shield 300 may slide in and out of Grill body 110. When inserted in Grill body 110, Adjustable radiant shield 300 separates Grilling grate 213 from a combustion space which may include Solid fuel grate 150, Gas burners 130, or both. The sliding of Adjustable radiant shield 300 from an in-grill position to the external position significantly changes not only the radiant energy passing from the combustion space to Grilling grate 213 it may also significantly change the convection in the area of Adjustable radiant shield 300. Because Adjustable radiant shield 300 may be positioned between the in-grill position and the external position at a nearly unlimited number of positions, the heat transfer characteristics between the combustion space and Grilling grate 213 are similarly nearly unlimited. Push tab 370 may be welded to Bottom plate 330 of Adjustable radiant shield 300. Push tab 370 may be used to position Adjustable radiant shield 300 in a range of positions along the continuum between the in-grill position and the external position thereby varying the extent to which radiation may pass to Grilling grate 213. Top plate 310 may be configured to have Top plate holes 320 and Bottom plate 330 may be configured to have Bottom plate holes 337. Such holes may be patterned such that when Top plate 310 is properly aligned with Bottom plate 330 most or all of Bottom plate holes 337 align with Top plate holes 320. The position of Top plate 310 relative to Bottom plate 330 in which Bottom plate holes 337 achieve maximum alignment with Top plate holes 320 may be considered fully open. The diameter of individual holes along with the alignment of those holes between Top plate 310 and Bottom plate 330 determines the maximum extent of shielding of radiant energy by Adjustable radiant shield 300 and the minimum extent of shielding through Adjustable radiant shield 300. The holes may, for example, be 5/16 inch holes. The ability to move Adjustable radiant shield 300 laterally along with the ability to adjust the openness of Adjustable radiant shield 300 creates the potential for course adjustments to radiant shielding, through lateral movements, and finer adjustments to radiant shielding through adjustments to the openness of Adjustable radiant shield 300.

Because Adjustable radiant shield 300 may frequently be obscured because of its position within Grill body 110 or its position beneath Grill side trays 180, it may be difficult to ascertain the alignment of the holes. Top plate alignment tab 323 and Bottom plate alignment tab 340 may be positioned together as an alignment guide. When Bottom plate holes 337 and Top plate holes 320 are at maximum alignment, Top plate alignment hole 325 in Top plate alignment tab 323 may be aligned with Bottom plate alignment hole 343 of Bottom plate alignment tab 340. Thus, the extent of alignment of Top plate alignment hole 325 and Bottom plate alignment hole 343 may be used as a guide indicating the extent of openness of Adjustable radiant shield 300.

Adjustable radiant shield 300 may be configured such that Top plate 310 is configured to slide within certain confines dictated by the configuration of Bottom plate 330. Top plate 310 may slide between two Slide past fold-over guides 333 which may be portions of the sheet metal from which Bottom plate 330 is constructed folded over in a way that guides the movement of Top plate 310. Similarly, Slide stop fold-over guide 335 may serve both to restrain the movement of Top plate 310 and act as a stop limiting the lateral movement of Top plate 310 relative to Bottom plate 330.

Top plate 310 may be arranged both parallel and adjacent to Bottom plate 330. Top plate 310 may be configured such that it has a Top plate main body 313, a Top plate bend 315, and a Top plate shelf 317. A combination of these three elements creates a space between Top plate 310 and Bottom plate 330 on the side of Adjustable radiant shield 300 opposite Slide stop fold-over guide 335. Overlap adjustment knob 353 may be constructed such that it is in a fixed position relative to Bottom plate 330 and such that it drives a Rack and pinion adjustment system 350. Rack and pinion adjustment system 350 may include more than one rack and pinion gear systems configured to adjust the relative position of Bottom plate 330 to Top plate 310 by way of turning Overlap adjustment knob 353.

Because Adjustable radiant shield 300 may have the ability to close off upward traveling exhaust entirely, a Bypass exhaust 190 may be present and may serve to reroute combustion exhaust gases around Adjustable radiant shield 300 when the direct flow path from Solid fuel grate 150 to Grilling grate 213 is limited. The ability to reroute combustion exhaust may be utilized during operation of the grill. For example, Adjustable radiant shield 300 may be positioned within the grill prior to opening the grill such that a person operating the grill may avoid significant exposure to the combustion exhaust while tending to the food.

Shield support 380 may, for example, be 72 inches wide inside the track created by Shield support 380. Shield support 380 may, for example, be 19⅛ inches deep inside the track created by Shield support 380. Adjustable radiant shield 300 may be 18¾ inches deep from the outside of Slide past fold-over guides 333 to the outside of Slide past fold-over guides 333. Top plate main body 313 may be 16 inches wide and Top plate 310 may be 20 inches wide including Top plate main body 313, Top plate bend 315, and Top plate shelf 317. The space in which Rack and pinion adjustment system 350 operates, namely the space between Top plate shelf 317 and Bottom plate 330 may be 1⅝ inches tall. In total the dimensions for Grilling grate 213 may be 19⅛ inches by 31½ inches. There may, for example be 7 inches separating Adjustable radiant shield 300 and Gas burners 130.

Adjustable radiant shield 300 may be used in the cooking of various foods. For example, Adjustable radiant shield 300 may be in the out of grill position during an initial period of cooking in which meat or some other food is seared or caramelized. Adjustable radiant shield 300 may then be moved into place beneath the food to allow the meat or other food to complete the cooking while exposed to a lesser degree of radiant heat. In a related example, foods that require different intensities of cooking may be cooked adjacent to one another by positioning food that requires a lower intensity of radiant heat to the outside of the food that requires the higher intensity of radiant heat. Adjustable radiant shield 300 may then be slid along Shield support 380 until Adjustable radiant shield 300 is below the food requiring a lower intensity of radiant heat, but not below the food requiring the higher intensity heat. Different intensities of radiant heat may be applied in different areas allowing cooking of foods with different heating requirements adjacent to one another. This may be accomplished by positioning food that requires a lower intensity of radiant heat above Adjustable radiant shield 300 while food that requires a higher level of radiant heat is directly exposed to the radiant heat without shielding by Adjustable radiant shield 300. In certain circumstances the timely application of Adjustable radiant shield 300 to control the radiant heat may allow food to finish cooking on a hot grill without burning the food.

In certain embodiments, the area percentage of the cooking grate that may be obscured from the combustion space by the radiant shield may be greater than 30%. In certain embodiments, the area percentage of the cooking grate that may be obscured from the combustion space by the radiant shield may be greater than 50%. In certain embodiments, the area percentage of the cooking grate that may be obscured from the combustion space by the radiant shield may be greater than 70%.

In certain embodiments, the aperture through which the radiant shield passes into the body of the grill may have a width that is at least four times greater than its height. In certain embodiments, the aperture through which the radiant shield passes into the body of the grill may have a width that is at least 10 times greater than its height.

In certain embodiments, the radiant shield may be adjusted such that 5% of the radiant shield is open to radiation passing from the combustion area to the grill grate. In certain other embodiments, the radiant shield may be adjusted such that 10% of the radiant shield is open to radiation passing from the combustion area to the grill grate. In certain other embodiments, the radiant shield may be adjusted such that 15% of the radiant shield is open to radiation passing from the combustion area to the grill grate.

Grills described herein may, for example, comprise a body; a lid; a cooking grate; a combustion space within the body; a first plate; and an aperture in the body such that the lid and the body form a cooking enclosure; the cooking grate is substantially parallel to the first plate; the first plate is configured to move within the aperture; and the first plate is configured to move in and out of the cooking enclosure thereby limiting the extent of radiant flux between the combustion space and cooking grate based on the extent to which the first plate is in the cooking enclosure. In a related example, first plate comprises a first plurality of openings through which radiant heat may pass. In a related example, the grill may include a second plate such that the second plate may be substantially parallel to the cooking grate. In a related example, the grill may include a second plate such that the second plate includes a second plurality of openings through which radiant heat may pass. In a related example, the grill may burn charcoal and a fuel selected from propane and natural gas.

Grills described herein may, for example, comprise a body; a lid; a cooking grate; a combustion space within the body; a first plate; and a second plate such that the first plate includes a first plurality of openings through which radiant heat may pass; the second plate may include a second plurality of openings through which radiant heat may pass; the lid and the body may form a cooking enclosure; the cooking grate may be substantially parallel to the first plate; the cooking grate may be substantially parallel to the second plate; the first plate may be arranged and configured for motion relative to the second plate such that the first plurality of openings may alternatingly align and offset with the second plurality of openings thereby varying the rate of transmission of thermal radiation between the combustion space and the cooking grate; and the first plate and the second plate may be arranged and configured to move together relative to the body thereby varying the rate of transmission of thermal radiation between the combustion space and the cooking grate. In a related example, the first plate and second plate may be arranged and configured to move through an aperture in a wall of the body. In a related example, the first plate may be arranged and configured to engage in a sliding motion relative to the second plate. In a related example, a face of the first plate may be in contact with a face of the second plate. In a related example, the motion of the first plate may be controlled from outside of the base. In a related example, the motion of the second plate may be controlled from outside of the base. In a related example, the position of the first plate relative to the second plate may be adjusted by a rack and pinion adjustment.

As that phrase is used herein "substantially parallel" indicates a deviation from parallel of less than 15°.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:

1. A grill comprising
   a. a body;
   b. a lid;
   c. a cooking grate;
   d. a combustion space within the body;
   e. a first plate; and
   f. an aperture in the body;
   g. wherein the lid and the body form a cooking enclosure;
   h. wherein the cooking grate is substantially parallel to the first plate;
   i. wherein the first plate is configured to move within the aperture; and
   j. wherein the first plate is configured to move in and out of the cooking enclosure thereby limiting the extent of radiant flux between the combustion space and cooking grate based on the extent to which the first plate is in the cooking enclosure.

2. The grill of claim 1 wherein the first plate comprises a first plurality of openings through which radiant heat may pass.

3. The grill of claim 1 further comprising a second plate wherein the second plate is substantially parallel to the cooking grate.

4. The grill of claim 1 further comprising a second plate wherein the second plate comprises a second plurality of openings through which radiant heat may pass.

5. The grill of claim 1 wherein the grill burns charcoal and a fuel selected from propane and natural gas.

6. A grill comprising
   a. a body;
   b. a lid;
   c. a cooking grate;
   d. a combustion space within the body;
   e. a first plate; and
   f. a second plate;
   g. wherein the first plate comprises a first plurality of openings through which radiant heat may pass;
   h. wherein the second plate comprises a second plurality of openings through which radiant heat may pass;
   i. wherein the lid and the body form a cooking enclosure;
   j. wherein the cooking grate is substantially parallel to the first plate;
   k. wherein the cooking grate is substantially parallel to the second plate;
   l. wherein first plate is arranged and configured for motion relative to the second plate such that the first plurality of openings may alternatingly align and offset with the second plurality of openings thereby varying the rate of transmission of thermal radiation between the combustion space and the cooking grate; and
   m. wherein the first plate and the second plate are arranged and configured to move together relative to the body thereby varying the rate of transmission of thermal radiation between the combustion space and the cooking grate.

7. The grill of claim 6 wherein the first plate and second plate are arranged and configured to move through an aperture in a wall of the body.

8. The grill of claim 6 wherein the first plate is arranged and configured to engage in a sliding motion relative to the second plate.

9. The grill of claim 6 wherein a face of the first plate is in contact with a face of the second plate.

10. The grill of claim 6 wherein the motion of the first plate is controlled from outside of the base.

11. The grill of claim 6 wherein the motion of the second plate is controlled from outside of the base.

12. The grill of claim 6 wherein the position of the first plate relative to the second plate is arranged and configured for adjustment by a rack and pinion adjustment.

* * * * *